(12) United States Patent
Cheung et al.

(10) Patent No.: US 8,321,325 B2
(45) Date of Patent: *Nov. 27, 2012

(54) SYSTEMS AND METHODS FOR COMPRESSION OF TRADE-RELATED RECORDS

(75) Inventors: Liam Cheung, St. Lambert (CA); Mohamed Hirani, Toronto (CA); Robert Bruce Pitt, Aliso Viejo (CA); Eric Jonathan Stoop, Ladera Ranch (CA)

(73) Assignee: Verticlear, Inc., San Juan Capistrano, CA (US)

( * ) Notice: Subject to any disclaimer, the term of this patent is extended or adjusted under 35 U.S.C. 154(b) by 333 days.

This patent is subject to a terminal disclaimer.

(21) Appl. No.: 12/716,682

(22) Filed: Mar. 3, 2010

(65) Prior Publication Data

US 2011/0218899 A1    Sep. 8, 2011

(51) Int. Cl.
*G06Q 40/00* (2006.01)
(52) U.S. Cl. ............................................. 705/37; 705/35
(58) Field of Classification Search .................... 705/35, 705/37
See application file for complete search history.

(56) References Cited

U.S. PATENT DOCUMENTS

| | | | |
|---|---|---|---|
| 4,730,348 A | 3/1988 | MacCrisken | |
| 4,872,009 A | 10/1989 | Tsukiyama et al. | |
| 5,270,712 A | 12/1993 | Iyer et al. | |
| 5,414,425 A | 5/1995 | Whiting et al. | |
| 5,424,732 A | 6/1995 | Iyer et al. | |
| 5,557,749 A | 9/1996 | Norris | |
| 5,987,432 A * | 11/1999 | Zusman et al. | 705/35 |
| 7,386,046 B2 | 6/2008 | Fallon et al. | |
| 2001/0018676 A1 | 8/2001 | Iida et al. | |
| 2004/0042506 A1 | 3/2004 | Fallon et al. | |
| 2005/0256799 A1 | 11/2005 | Warsaw et al. | |
| 2006/0080215 A1 | 4/2006 | Warsaw et al. | |
| 2007/0118459 A1 | 5/2007 | Bauerschmidt et al. | |
| 2008/0243675 A1 | 10/2008 | Parsons et al. | |
| 2009/0234776 A1 | 9/2009 | Bauerschmidt et al. | |
| 2009/0287839 A1 | 11/2009 | Fallon et al. | |
| 2009/0327117 A1 * | 12/2009 | Lee et al. | 705/37 |
| 2011/0218900 A1 | 9/2011 | Cheung et al. | |

* cited by examiner

*Primary Examiner* — Jagdish Patel
*Assistant Examiner* — Sara C Hamilton
(74) *Attorney, Agent, or Firm* — Knobbe, Martens, Olson & Bear LLP

(57) ABSTRACT

In certain embodiments, a computer system and process for use in a trading system are provided that allow trading entities to compress trade records while simplifying the reconciliation process. Advantageously, compressed trade records are processed by a custodian firm, while uncompressed reconciliation data are processed by a central counterparty. In some embodiments, a computer system and process are provided that allows trading entities to compress trade records across markets. Advantageously, compression across markets provides a larger pool of eligible trade records for compression, increasing the number of compressible trades, and thus reducing fees paid by the trading firm and the amount of data transmitted.

19 Claims, 7 Drawing Sheets

SYSTEMS AND METHODS FOR COMPRESSION OF TRADE-RELATED RECORDS

BACKGROUND OF THE INVENTION

After a stock or other security order is placed by a trader at a brokerage's front office, there are several further post-order processing steps involved in the transactions, such as confirmation, payment, settlement and accounting. As part of the clearance and settlement process, trades may be reported to a reporting authority or central counterparty, such as Canada's Clearing and Depository Services, Inc. (CDS) or the United State's Depository Trust and Clearing Corporation (DTCC), which matches the trades with opposing trades and reports matches and mismatches to the brokerage. These steps may be handled internally by the brokerage or by outside custodian or clearance firms.

In order to efficiently process large volumes of trades, brokerages may use aggregation of trade data to minimize the number of trade records or fills to be processed which in the industry is called trade compression. In trade data compression, similar trade records are combined into a single trade record aggregating multiple transactions into a single transaction record.

BRIEF DESCRIPTION OF THE DRAWINGS

Throughout the drawings, reference numbers may be re-used to indicate correspondence between referenced elements. The drawings are provided to illustrate embodiments of the inventions described herein and not to limit the scope thereof.

DETAILED DESCRIPTION OF THE PREFERRED EMBODIMENTS

Figure 1A:
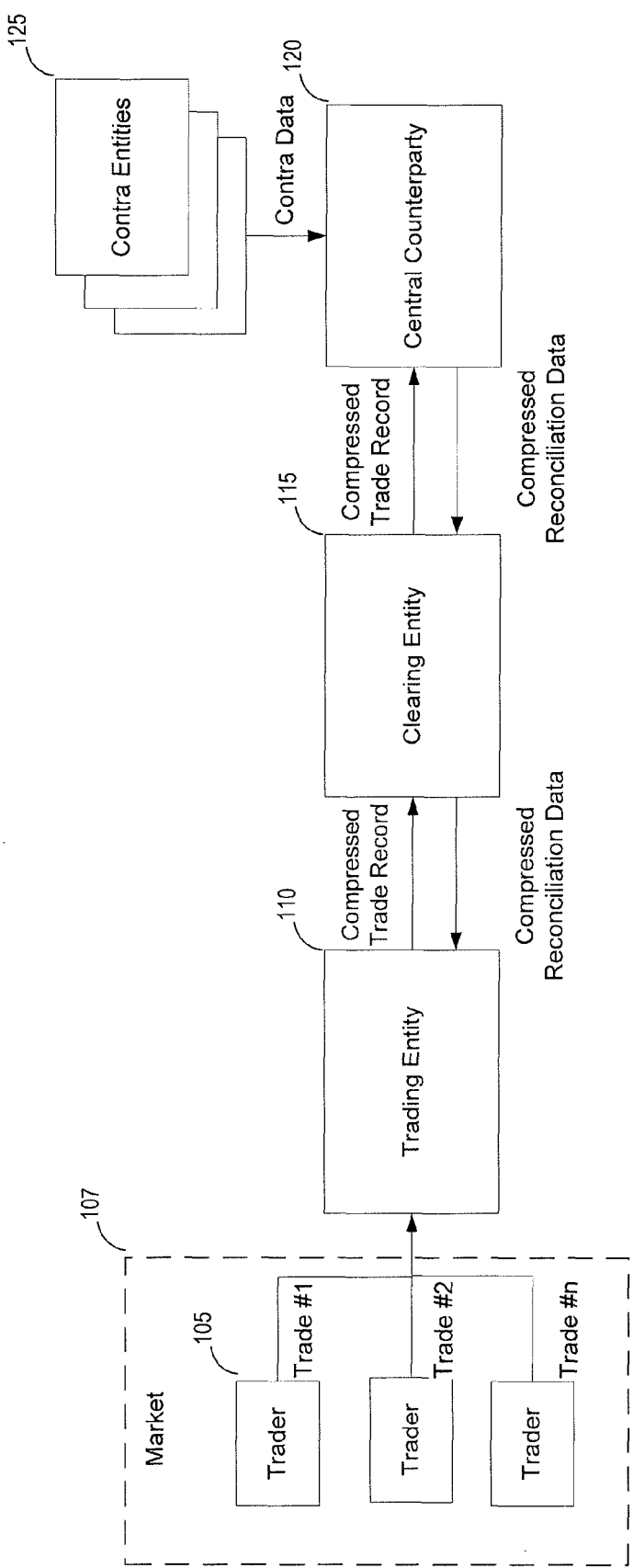
FIG. 1A illustrates a data flow diagram for a prior art trade compression system.

Securities trading systems process millions of transactions daily. In order to better handle large trading volumes, many trading entities engage in trade compression, where trades from a particular trader are periodically aggregated by side of transaction (e.g. buy or sell) and the security traded, typically at the end of the day. This reduces the number of trade records that are submitted for clearing and internal trade processing. Generally, an outside clearing entity, such as a custodial or clearing firm maintains books and records of accounts, holds securities on behalf of a customer, and/or processes, settles and affirms transactions for the trading entity. As these clearing entities typically charge per trade record or fill submitted, reducing the number of trade records allows trading entities to lower their processing costs, particularly for high-frequency, high-volume traders. Once processed by the clearing entity, trade records are generally forwarded to a central counterparty in their compressed format to be reconciled against market data.

Because the data has been aggregated, existing compression systems create additional complexity in the reconciliation process. During reconciliation, trades from one side of a transaction are matched with trades from the other side of the transaction. Matched trades can then be settled and cleared. Sometimes, mismatches or "breaks" in the transaction are reported, which need to be resolved. However, as breaks and mismatches are encountered, the corresponding trade information may no longer be available in the aggregated data as it has been compressed. Typically, a compressed trade records does not identify its source pre-compression trade records, requiring a review of the pre-compressed data to identify the corresponding uncompressed trade records. The review process to find the original trade record prior to the compression can be laborious and time-intensive.

Furthermore, existing compression systems are generally limited to compression of trade data from a single market. As part of the clearing process, clearing entities report trades on a market to a central counterparty, such as the CDS or the DTCC. However, central counterparties for particular markets ordinarily do not process trade data from other markets. This prevents trading entities from further compressing trades records across markets, as the resulting compressed cross-market trade record would not be processed by the central counterparty. This also limits the pool of trade records available for compression, limiting the odds of finding matching trade records eligible for compression.

In certain embodiments, a computer system and process for use in a trading system are provided that allow trading entities to compress trade records while simplifying the reconciliation process. Advantageously, compressed trade records are sent for processing to a custodian firm, while uncompressed reconciliation data are processed by a central counterparty. In some embodiments, a computer system and process are provided that allows trading entities to compress trade records across markets. Advantageously, compression across markets provides a larger pool of eligible trade records for compression, increasing the number of compressible trades, and thus reducing fees paid by the trading firm.

For purposes of illustration, the trading system will be described in the context of a stock trading system where traders place orders with trading entities. As will be recognized, however, stocks are merely one type of securities that can be handled by the trading system. Other examples of securities include derivatives, futures, options, mutual funds, bonds, and/or the like. Traders can include anyone who places orders for a security, such as individuals, institutions, fund managers, stockbrokers, or the like. Trading entities receive the orders and executes those orders on a market. Trading entities can include brokerages, banks, investment banks, or the like. Typically, trading entities are required to report these trades to a central counterparty for verification and matching.

The process of compression generally involves the generation of a single record representing multiple records of financial transactions. For example, generating a compressed record can include combining multiple records or creating a new record to represent multiple records. Uncompressed records are generally records that represent a single transaction, records that have not been compressed, and/or records that are no longer compressed. "Compressed" and "uncompressed" do not necessarily refer to data compression, and compressed and uncompressed records may or may not also have data compression applied in order to reduce the number of data bits.

FIG. 1A illustrates a data flow diagram for a prior art trade compression system. Traders 105 place orders for stocks with a trading entity 110, such as a brokerage firm that handles trades for individual and/or institutional investors. The trading entity executes those trades on a market 107. The market or venue where a trading transaction takes place can include an exchange like NASDAQ, NYSE, or the Toronto Stock Exchange (TSX), an Electronic Communication Network (ECN), an Alternative Trading System (ATS) such as Alpha Trading Systems (Alpha), an execution venue, or the like. These orders can be represented by trade records of the transactions. Trade records can be transmitted over a network as part of a trade/ticket instruction transmission containing a list of trade records where a trade record can represent single or multiple trades.

Typically, a trading entity 110 will aggregate trading data and transmit the data to a clearing entity 115, such as a custodial or clearing firm for processing. The clearing entity 115 generally handles maintaining and updating client account data for the trading entity 110, such as crediting or debiting of accounts. The clearing entity can be a business process outsourcing company, an information technology service company, a clearance firm, a bank, a brokerage, or the like. The clearing entity typically provides services related to clearance and settlement of trades, bookkeeping, and other back office processing of the trade records. In a typical trading transaction, buy orders are matched with sell orders during trade matching and parties agree to the trade. After matching, trades enter the settlement and clearing process. Generally, settlement is the exchange of money and securities between the parties of a trade on a settlement date, which generally occurs 1-3 days after the parties agreed on the trade. Most settlement of securities trading is done electronically. Generally, clearing is the process of updating the accounts of the trading parties.

As part of its services, the clearing entity 115 typically reports the trades on behalf of the trading entity 110 to a central counterparty 120, such as, for example, Canada's Clearing and Depository Services, Inc. (CDS), the Canadian Derivatives Clearing Corporation (CDCC), the United State's Depository Trust and Clearing Corporation (DTCC), National Securities Clearing Corporation (NSCC), or Depository Trust Corporation (DTC), or the like. Generally, a particular central counterparty handles trades for particular markets. The correlation of central counterparty to market can be based on geography, political boundary, security type or other criteria. For example, in Canada, trades for certain security types on TSX and Alpha are both reported to CDS, but could not be reported to the DTCC in the U.S. Central counterparties generally provide services for matching and clearance and settlement of trades.

In order to minimize the number of trade records and reduce processing fees, the trading entity can sometimes compress multiple trades into a single trade. For example, if trader A places three orders for 100, 200, and 300 shares of stock X at different times during the day, the trading entity 110 can compress those trades into a single trade for 600 shares of stock X and send one trade record instead of three to the clearing entity 115. Trades can be compressed at the end of the day or in shorter intervals. Some trades may be sent to the clearing entity 115 uncompressed if no other corresponding trade can be found, such as where no trade from the same account for the same security is found during the relevant time period.

The central counterparty receives contra data from contra entities 125, such as other banks, brokerages, depositories, clearing houses, exchanges or the like, that are on the opposite side of the trade with the trading entity 110. The central counterparty then matches trades from one side of the transaction (e.g. buy) to trades on other side (e.g. sell). For example, if the trading entity 110 is buying 100 shares of stock X, then the central counterparty 120 would match those buys with a contra entity 125 selling 100 shares of stock X. Reconciliation data, including the contra data, can be transmitted to the clearing entity 115, which can process the data and/or transmit the data to the trading entity. The reconciliation data can be used to determine which transactions were matched.

For purposes of illustration, a sample stock transaction in the prior art system of FIG. 1 will now be discussed. In this sample scenario, multiple traders 105 place stock trades with a trading entity 110 for stocks listed on a market 107. Typically, the trading entity 110 receives the stock trades and selects a market in which to execute the trade. The trading entity compresses eligible trades periodically and sends these compressed trade records to the clearing entity 115. Some trade records can be sent uncompressed if no corresponding trade record from the same trader for the same stock is found. Compressed and uncompressed trade records can be sent together in the same trade/ticket instruction transmission.

The clearing entity 115 processes the compressed trade records and then reports them to the central counterparty 120. The central counterparty receives trading data from multiple contra entities 125, including clearing entities, exchanges, and/or trading entities. The central counterparty 120 matches the compressed trades with opposite trades from the contra entities 125 and generates reconciliation data, including data indicating which trades were successfully matched. Typically, when the matching process is completed for the firm, information is sent back to the clearing entity 115 which is then transmitted to the trading entity 110 for reconciliation.

The trading entity 110 can use the reconciliation data to determine which trades were successfully matched during reconciliation. However, using trade compression can add additional complexity to the reconciliation process. As the reconciliation data for a compressed trade represents aggregated data for multiple trades, the trading entity will generally have to determine which pre-compression trading records are likely candidates for the break and then research each one until the most likely candidate is determined. Because compressed trade records can be based on any number of uncompressed trade records, such a process can be time intensive and may require manual review of the pre-compression records to determine the particular failed trade.

Figure 1B:
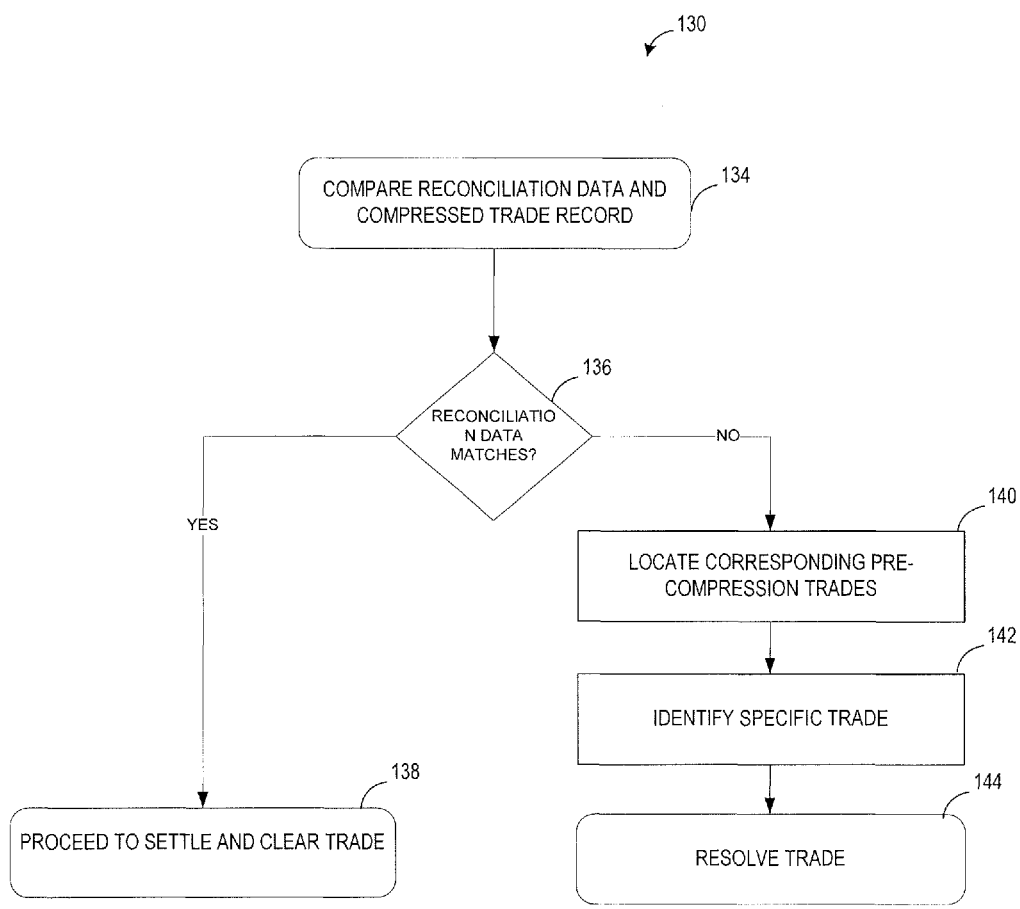
FIG. 1B illustrates a reconciliation process 130 for compressed trades that may be implemented by the trading entity 110 of FIG. 1A.

FIG. 1B illustrates a reconciliation process 130 for compressed trades that may be implemented by the trading entity 110 of FIG. 1A. The trading entity receives reconciliation data from a central counterparty, usually via its clearing entity, and compares the reconciliation data with its trading data. For each compressed trade, the trading entity can use the reconciliation process 130 to validate the compressed trade.

At block 134, the clearing entity compares a compressed trade record with the reconciliation data to find a corresponding contra trade. Typically, there are two types of mismatches or breaks. In the first type, a trade appears in the trading data but not in the reconciliation data. In the second type, a trade appears in the reconciliation data but not in the trading data. The mismatches can be whole or partial. For example, a trade record may have no matching reconciliation trade or the trade record may have only a partial matching amount in the reconciliation data. In some cases, there may be a price mismatch between trade records.

At decision block 136, if the compressed trade record has a match, the process proceeds to block 138. However, if there is a mismatch, the process proceeds to block 140.

At block 138, the matched trade is verified and the trading entity may proceed to settle and clear the trade. For example, the trading entity can direct its clearing entity to send/receive funds from the central counterparty in order to settle and clear the trade break.

At block 140, the trade records corresponding to the compressed trade record are located. Typically, the trade records are for the trades for day for the trader for that security which was compressed. This can end up being one trade or hundreds of thousands of individual trades. This then represents the potential trades that may have caused or been affected by the break.

At block 142, each uncompressed trade may need to be reviewed to identify an unmatched trade. Such a review may be time intensive and costly.

At block 144, after a missing trade is identified the trading entity can attempt to resolve the trade. In one example, the trading entity can determine and contact the contra party to the trade and verify if the trading entity's trading data is correct.

Figure 2:
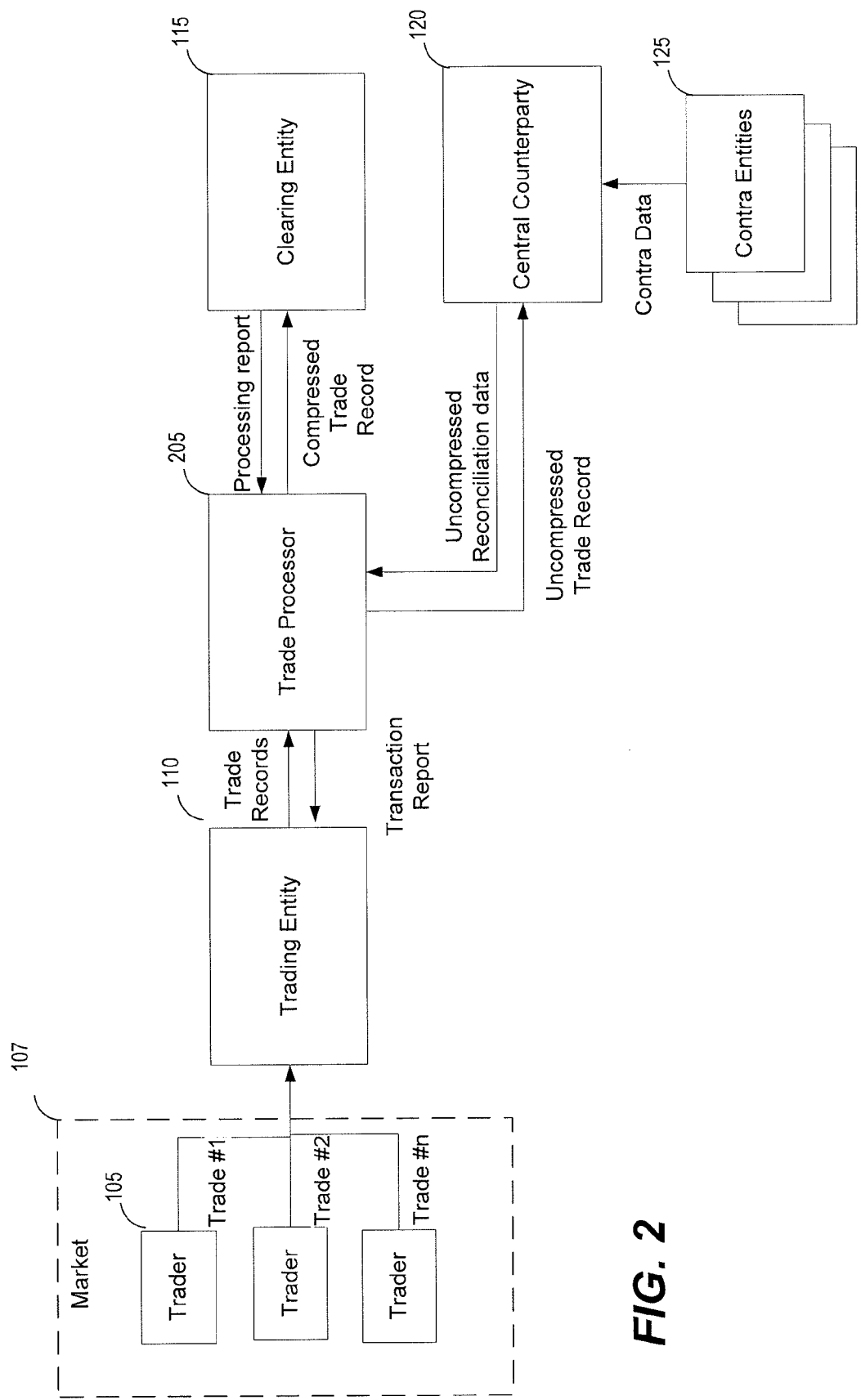
FIG. 2 illustrates a data flow diagram for an embodiment of a trading system including a trade processor.

FIG. 2 illustrates a data flow diagram for an embodiment of a trading system including a trade processor 205. In comparison to FIG. 1, the entities are generally the same but include the trade processor to address the problems described above for the prior art system.

In FIG. 2 and in FIG. 1, arrows represent the transmission of information over a network between the computing systems operated by the respective entities. Transmission can be through any protocol, such as TCP/IP, FTP, email, point-to-point, API transfers, and/or the like. The transmitted information can include trade records and/or trade/ticket instruction transmissions. In some embodiments, the format of the trade records and/or trade/ticket instruction transmission may change as the trade records are transmitted from one entity to another but still represent the same transactions. For example, a clearing entity may use one trade record format to denote a transaction while a central counterparty uses another format, in which case the clearing entity may reformat the trade record if it transmits it to the central counterparty.

Trade records can be sent as part of a trade/ticket instruction transmission. The trade/ticket instruction transmission can be a text file, an XML file, a FIX file and/or transmission, SWIFT file and/or transmission, a file in another file format, and/or a transmission in another protocol. In some embodiments, the trade/ticket instruction transmission contains trade records from multiple markets grouped by the source market.

Traders 105 place orders for stocks offered on a market 107 with a trading entity 110, which executes those orders on the market. Typically, the trading entity 110 generates trade records representing its trading transactions and transmits the uncompressed trade records to a trade processor 205. In one embodiment, the trading entity can send compressed and uncompressed trade records to the trade processor, such that the trade processor does not need to compress the trade records. The trade processor then processes the trades records received. Such processing can include compressing trade records, reconciliation, and/or reporting of trades. The trade processor can be an independent entity or can be part of the trading entity. Although a single trading entity is shown in FIG. 2, the trade processor will typically handle the compression and reporting tasks for many different trading entities.

The trade processor 205 can send compressed trade records to the clearing entity 115 for further processing, such as bookkeeping. By sending compressed data to the clearing entity, the number of trade records sent for processing is reduced allowing efficient and faster data transfer due to the lesser number of trade records as well as potentially reducing the processing fees charged by the clearing entity. However, instead of allowing the clearing entity to report the trades to the central counterparty 120 (as shown in FIG. 1), the trade processor 205, in some embodiments, can direct the clearing entity to not report the trades to the central counterparty. Instead, the clearing entity may report back to the trade processor (as shown) or report to some entity other than the central counterparty. Thus, the central counterparty does not receive the compressed trade records.

In FIG. 2, the trade processor 205 reports the trades to the central counterparty 120 itself, allowing the trade processor to control the format of the reported trade data. The trade processor can thus send uncompressed trade data to the central counterparty 120. The central counterparty matches the uncompressed trade data with contra data from contra entities 125 and generates and sends reconciliation data for the uncompressed trades back to the trade processor. If a break or mismatch is detected, the reconciliation data can provide sufficient detail to identify the individual trade record instead of the compressed trade record, simplifying the reconciliation process for the trade processor or trading entity 110. For example, instead of reporting only on the status of compressed trade A, made up of trades X, Y, and Z, the reconciliation data contains information on each of trades X, Y and Y, allowing the trade processor to determine that a particular trade, trade X, caused a break.

Typically, the central counterparty 120 reports the reconciliation data to the trade processor 205. The trade processor can perform reconciliation of trades using the reconciliation data and/or send the reconciliation data to another entity, such as the trading entity or clearing entity.

As will be apparent, the reconciliation data can be in any format, such as, for example, a list of trade records. In some embodiments, the reconciliation data can be sent in a report or a trade/ticket instruction transmission. The report or trade/ticket instruction transmission can contain reconciliation data for compressed and/or uncompressed trade records.

By managing the transmission of both uncompressed and compressed trade data, the trade processor 205 can receive uncompressed reconciliation data while retaining the benefits of sending compressed trade data to the clearing entity 115. Receiving uncompressed reconciliation data simplifies the reconciliation process by eliminating the need for restoring the data to its pre-compressed state and allowing easier identification of the cause of a break. Matching of breaks with trades can be relatively straightforward, which lends itself to greater automation of the reconciliation process and reduced reviewing costs. Thus, the trade processor 205 can more easily determine which trades were matched using uncompressed reconciliation data from the central counterparty 120. In some embodiments, the trade processor generates a report of the trade results (depicted as a "transaction report" in FIG. 2) and transmits the report to the trading entity 110.

As will be apparent (and as described below), the functions described above as being performed by the trade processor 205 may alternatively be performed, in whole or in part, by the trading entity 110. For example, the trade processor 205 (or another entity) may provide the trading entity 110 with software or a computing system for automating these functions. Thus, in some embodiments, the trade processor entity 205 shown in FIG. 2 may be omitted from the process flow.

Where the trade processor 205 is part of the process flow, the trading entity 110 may be provided with special software for integrating its system with that of the trade processor 205.

Furthermore, tasks described as being performed by a particular entity (e.g., the trade processor, central counterparty, etc.) may be, and typically are, performed automatically by a computing system operated by that entity. For example, compression, restoration of compressed records, and/or review of trade records may be partially or fully automated and performed by a computing system. In addition, while data is described as transmitted over a network, data can also be exchanged between entities using physical storage, such as optical media, flash memory, magnetic drives, and/or the like.

Figure 3:
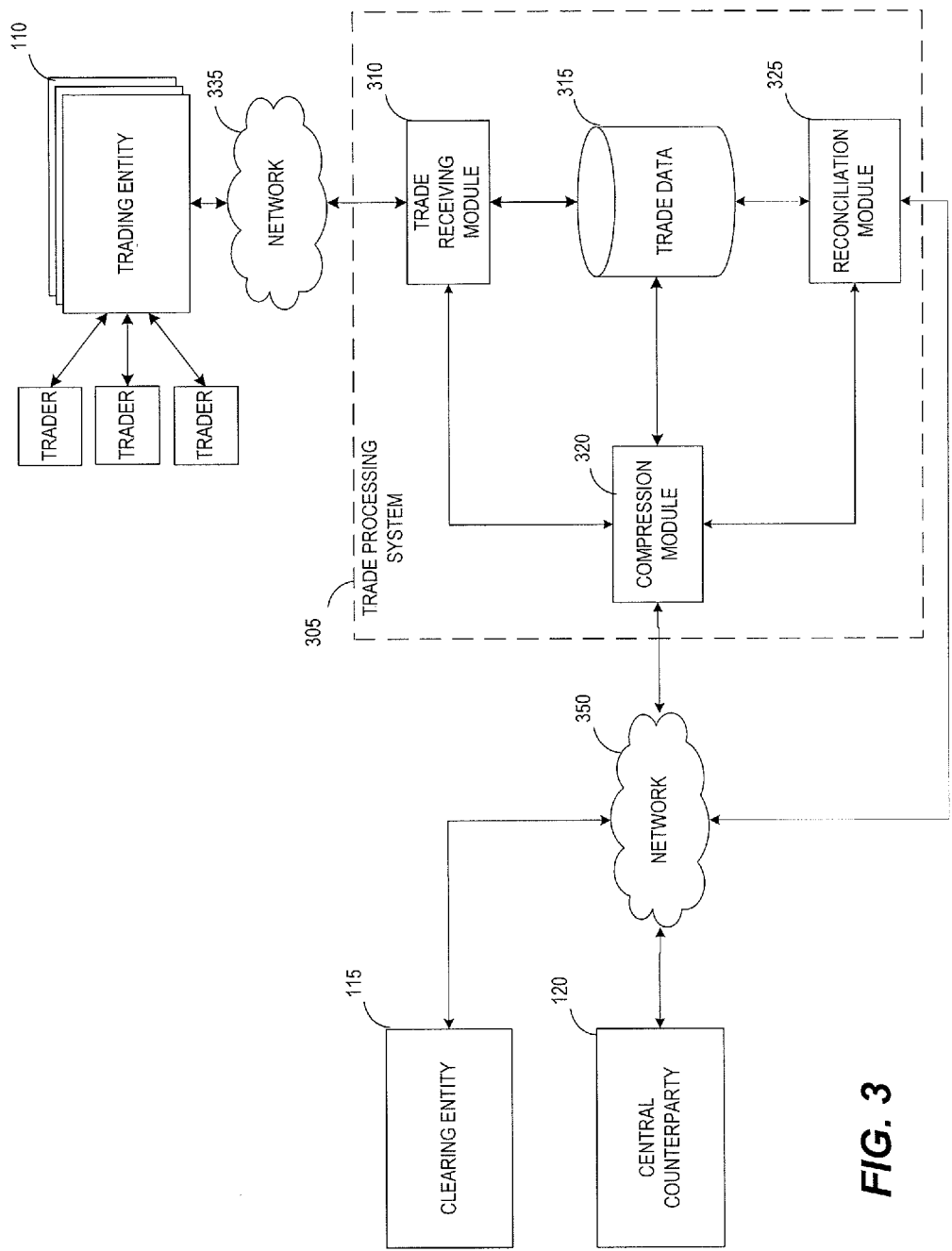
FIG. 3 illustrates an embodiment of a trade processing system that automates the functions of the trade processor of FIG. 2.

FIG. 3 illustrates an embodiment of a trade processing system for use with a trading system that automates the above-described functions of the trade processor 205 of FIG. 2. The trade processing system 305 can be operated by a trade processor (as in the embodiment of FIG. 2), a trading entity, or another entity seeking to compress trade records. The trade processing system includes a trade receiving module 310 for receiving trade data, a data repository 315, such as a database, for storing the trade data, and an optional compression module 320 for selectively compressing trade data. In one embodiment, the trade processing system receives already compressed data from the trading entity such that compression by the trade processing system is unnecessary. Optionally, the trade processing system can include a reconciliation module 325 for performing reconciliation of trades. The illustrated components of the trade processing system operate on a computing system that comprises one or more computing devices, such as one or more general purpose computers, servers, and/or mainframes. In one embodiment, the components of the trade processing system operate on a single computing device. In another embodiment, one or more components are on separate computing devices in communication with other components through a local or wide area network. Some of the functions of the trade processing system 305 may alternatively be embodied in application-specific circuitry.

In FIG. 3, the trade processing system 305 is in communication with one or more trading entities 110 through a first communication network 335. Trading entities can send trade data to the trade processing system and/or receive trade processing reports from the trade processing system. The trade processing system can also be in communication with one or more clearing entities 115 and/or one or more central counterparties 120 through a second communication network 350. The trade processing system can receive trade processing results, contra data, account and trader information, buy-power, margin information, and/or additional trade information from the clearing entity and/or central counterparty. The trade processing system can send compressed or uncompressed trade data to the clearing entity and/or central counterparty. The communication networks 335, 350 may be the same or separate networks. The communication networks can include a local network, a wide area network, and/or the Internet and can include wired and/or wireless mediums.

Figure 4:
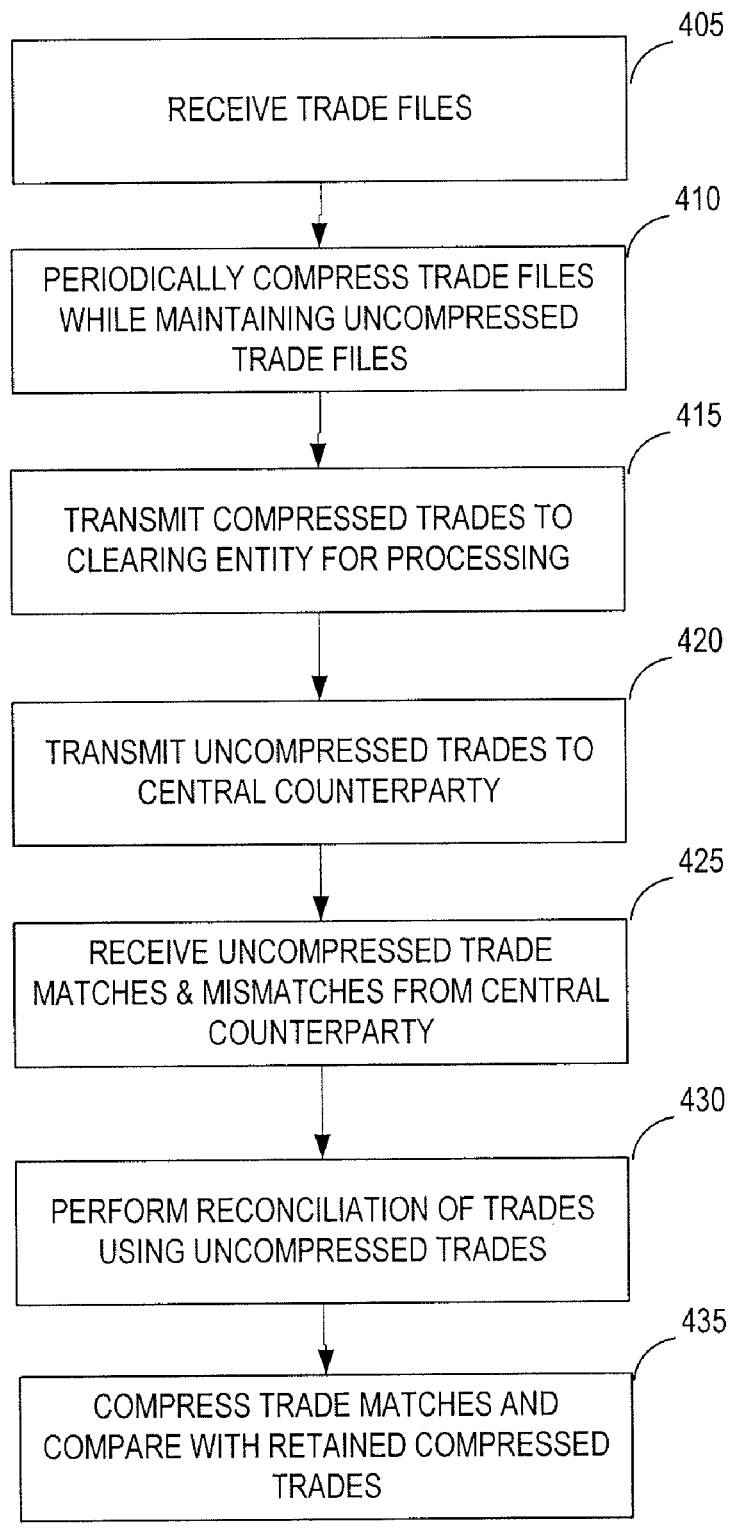
FIG. 4 illustrates an embodiment of a process that may be implemented by the trade processing system of FIG. 3.

FIG. 4 illustrates an embodiment of a process that may be implemented by the trade processing system 305 for performing the above-described tasks. As explained above, this process can be implemented by the trading entity 110 or the trade processor 205. The tasks shown in FIG. 4 may be performed automatically by execution of software by a computing system, and need not be performed in the particular order shown.

At block 405, the trade processing system receives trade records from the trading entity. The trade records are typically uncompressed and each trade record generally represents a single order. In some embodiments, the trade processing system receives trade records from multiple markets from the trading entity.

At block 410, the trade processing system periodically compresses eligible trade records while maintaining uncompressed trade records. The compression can occur at any interval rate including, but not limited to every 30 minutes, every hour, at the end of the day. In some embodiments, trade records of the same trading entity from multiple markets are compressed together.

At block 415, the compressed trades are transmitted to a clearing entity for processing. In some embodiments, uncompressed trade records are also transmitted where a trade record is ineligible for trade compression.

In some embodiments, transaction information can be received from the clearing entity after the clearing entity processes the compressed trades. This transaction information can be consolidated into the data sent to the central counterparty. These include deposits of stock certificates made directly to the clearing entity, trades that occurred via a verbal request such as a phone call, splits, mergers, corporate actions that change the holding quantity of the security, and/or the like.

At block 420, uncompressed trades are submitted to the central counterparty. The transmissions in block 415 and block 420 can occur simultaneously, sequentially in either order, or in different periods. In some embodiments, the uncompressed trades can be separated by the source market and sent to the respective central counterparty for the source market.

At block 425, the trade processing system receives reconciliation data having uncompressed trade matches and mismatches from the central counterparty. In some embodiments, the breaks or mismatches identify the particular trade records which generated the breaks. In some embodiments, the trade processing system can transmit the reconciliation data to the clearing entity for further processing of the data, such as clearing matched trades and unwinding failed trades.

At block 430, the trade processing system performs reconciliation of the trades using the uncompressed reconciliation data from the central counterparty. In some embodiments, breaks are determined using uncompressed trade records, allowing the particular trade which caused a break to be easily identified.

Optionally, at block 435, the trade processing system can compress the reconciliation data for comparison with the trading entity's trading data. By compressing the reconciliation data and comparing it to the trading data, the trade processing system can reduce the number of trade records reviewed and/or processed. For example, reconciliation data corresponding to several buy orders from a particular trader in the trading data can be compressed into a single compressed reconciliation trade record and compared with a compressed trade record, allowing reconciliation of the several buy orders using a single comparison. However, if the trade reconciliation using compressed data results in a mismatch, the trade processing system can still advantageously refer to the uncompressed data to determine the particular trade that failed. As will be apparent, the compressed trade record can be the previously generated trade record in block 410 or can be newly generated from the trading data.

Compression of reconciliation data and/or trading data during the reconciliation process may be implemented independently of trade compression for reducing clearing entity fees. In some embodiments, the trading entity and/or trade processor can send uncompressed trades to the clearing entity and central counterparty and only compress trades during the reconciliation process in order to improve efficiency in verifying trades.

Figure 5:
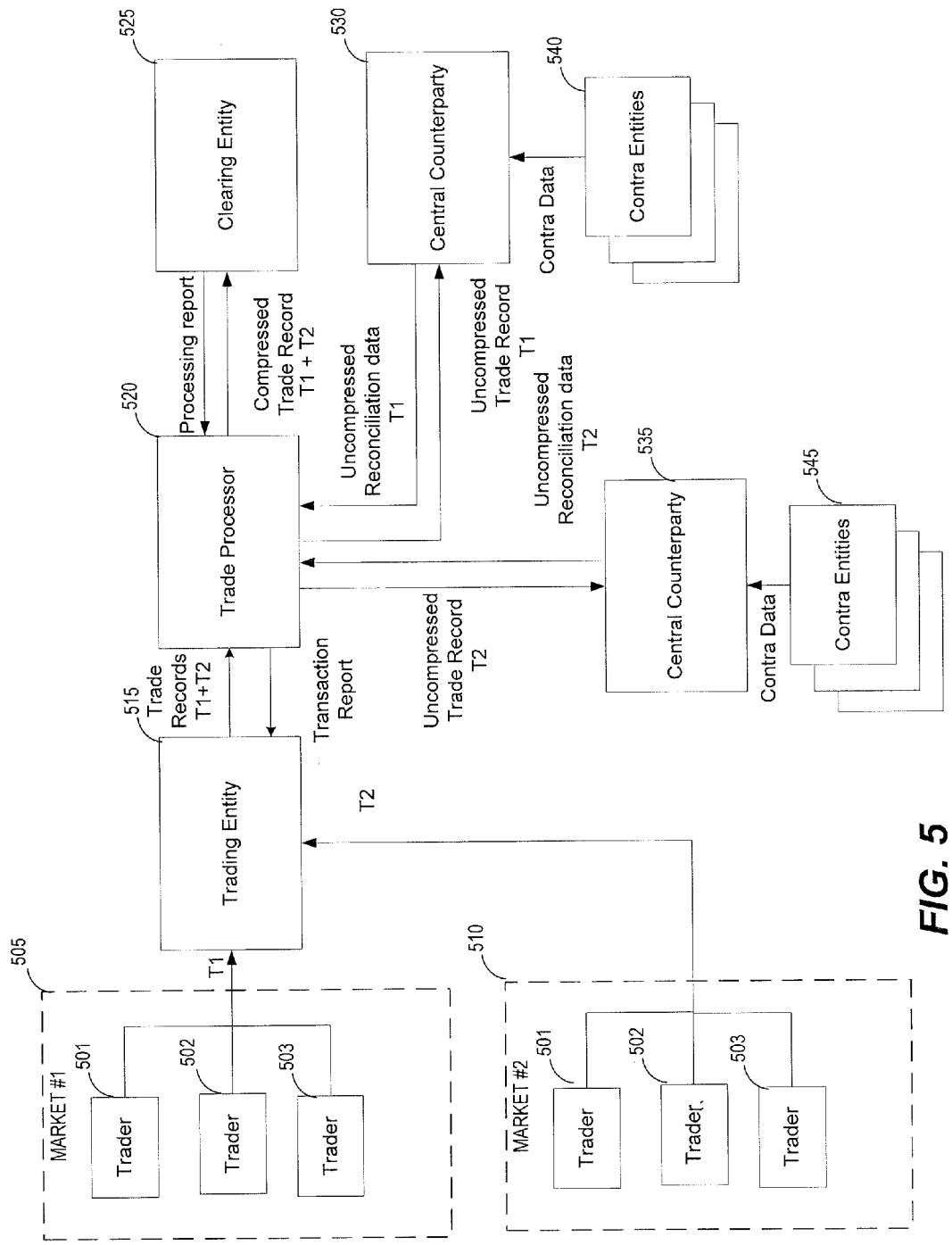
FIG. 5 illustrates a data flow diagram for an embodiment of a trading system allowing cross market trade compression.

FIG. 5 illustrates a data flow diagram for an embodiment of a trading system allowing cross market trade compression. Cross-market trade compression allows trades from different markets to be compressed into a single trade record. The source markets can be different exchanges or execution venues in the same country or in different countries. This creates a larger pool of trade records to be considered during the compression process, increasing the number of compressible trades and/or increasing the number of trades in a compressed trade record. By increasing the number of compressed trade records and/or the level of trade compression, trades records can be processed more efficiently. For example, less uncompressed trade records can be sent to a clearing entity, reducing the number of individual trade records to be processed by the clearing entity and thereby reducing costs and/or processing time. In FIG. 5, the trade processor 520 [205 of FIG. 3] is configured to compress trades across markets and transmit compressed trades to a clearing entity while separating and transmitting the corresponding uncompressed trades to the proper central counterparty for a particular market.

In existing trading systems, cross-market trade compression, where trades executed on different markets are compressed together, is not supported because central counterparties 530, 535 are unable to support reconciliation of compressed trades across multiple markets. Compressing trades across markets and sending the compressed trades to a clearing entity 525, which in turn sends the compressed trades to a central counterparty, would result in unprocessed or misprocessed trade data. However, by having a trade processor 520 selectively transmit trade data to the proper central counterparty instead of the clearing entity, the clearing entity can receive and process compressed cross-market data. For example, the trade processor can transmit trade data for a particular security type or from a particular territory to the corresponding central counterparty while transmitting cross-market compressed data to the clearing entity.

In FIG. 5, traders 501, 502, 503 place trades in a first market 505 (T1) and in a second market 510 (T2). Both sets of trades (T1+T2) are sent to a trading entity 515. The trading entity transmits the trade records (T1+T2) to the trade processor 520. Advantageously, the trade processor 520 can selectively compress the trade data to generate compressed and uncompressed trade records and determine their destination. In some embodiments, the trade processor 520 determines the destination central counterparty by using a market identifier in the trade data and looking up the corresponding central counterparty. In some embodiments, a central counterparty identifier may be contained in the trade data and can be used by the trade processor to determine the central counterparty.

As illustrated in FIG. 5, compressed cross-market trade records are sent to the clearing entity 525 for processing while uncompressed trade records corresponding to the compressed trades from the first market (T1) and second market (T2) are sent separately to the corresponding respective central counterparty 530, 535. By sending the corresponding uncompressed trades to the central counterparties instead of the compressed trade, the trade processor can split the uncompressed trades by market, advantageously allowing cross-market compression while reporting trades to the proper central counterparty. In some embodiments, the trade records are sent in trade/ticket instruction transmissions containing compressed and/or uncompressed trade records.

While FIG. 5 illustrates the trade processor 520 sending the trade records corresponding to the compressed trade to two central counterparties 530, 535, as will be apparent, the trade processor 520 can send the trade records to one or to multiple central counterparties, depending on what central counterparty is associated with a particular market. For example, if the first market 505 and the second market 510 report to the same central counterparty, the trade processor can report trades to a single central counterparty. In addition, while the trade processor 520 is illustrated as sending uncompressed trade records to the central counterparties 530, 535, the trade processor can send compressed trade records instead by compressing the trade records after determining the destination central counterparty. Thus, cross-market compression is independent of whether trades sent to the central counterparty are compressed or uncompressed.

The central counterparties 530, 535 compare the trade records with contra data from contra entities 540, 545 and send reconciliation data back to the trade processor 520. In the preferred embodiment, as the trade records received by the central counterparties are uncompressed, if a break or mismatch is detected, the reconciliation data can identify the individual trade record instead of a compressed trade record, simplifying the reconciliation process for the trade processor 520 or trading entity 515. In one embodiment, the reconciliation data is sent to the trade processor within a report or trade/ticket instruction transmission.

In one embodiment, the trade processor 520 can reconcile the trades and send a transaction report of the reconciled records to the trading entity 515. Alternatively, the trade processor can send the reconciliation data to the trading entity 515, which performs the trade reconciliation. In one embodiment, the reconciliation data can be compressed into a cross-market trade record for comparison with a compressed trade record, as described for a similar process above. By compressing the reconciliation data, multiple transaction records can be verified at a time.

Figure 6:
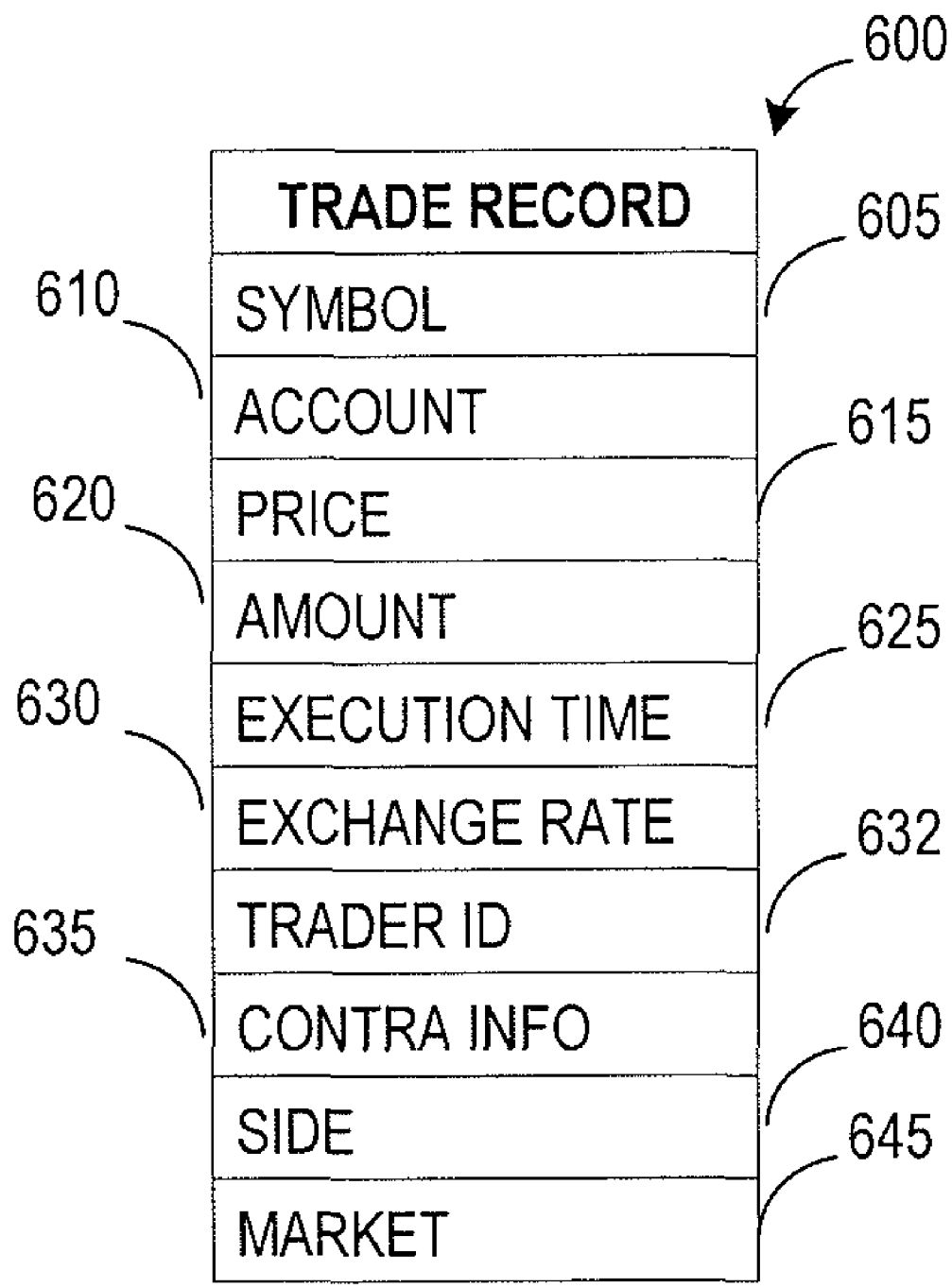
FIG. 6 illustrates an embodiment of a trade record representing a transaction.

FIG. 6 illustrates an embodiment of a trade record representing a transaction. Trade records can be generated by a trading entity to represent trading orders it receives or generates. Trade records or "fills" can be transmitted within a trade/ticket instruction transmission containing multiple trade records. The trade record 600 includes information for identifying a trade. Such information can include: a security symbol: 605, such as a Committee on Uniform Securities Identification Procedures (CUSIP) number, CUSIP International Number (GINS), an International Securities Identification Number (ISIN), a security ID, and/or the like; an account ID 610 for identifying a buyer or seller of the security such as account number or transaction ID; a price for the security 615; an amount of the security involved in the transaction 620; an execution time for the trade 625; a foreign exchange rate 630; a trader ID 632 identifying the trading entity, contra information about the opposite side of the trade 635, such as a trader ID, an Electronic Communication Network (ECN) identifier, and/or the opposite party's identity; a side of the transaction or transaction type 640 (e.g. buy or sell); and/or a market identifier 645. In some embodiments, the market ID can be used to identify the corresponding central counterparty for the market. In some embodiments, the market ID can comprise a central counterparty ID.

The information included in a trade record can vary depending on the recipient and/or sender of the trade record and can be stored in separate fields for easier processing. In some embodiments, only some of the above fields are used in a trade record, and/or additional fields are included. In some embodiments, a trade record representing a particular transaction can change formats as it is transmitted between different entities.

In some embodiments, a trade record includes fields for at least the symbol 605, the account 610, the price 615, the amount 620 and the transaction type 640. In some embodiments, trade records are eligible for compression if the trade records have matching fields on at least some of the above fields. For example, in one embodiment trade records for the same security, for the same account, and for the same transaction type or side are eligible for compression and can be compressed by aggregating the amount and/or averaging the price paid. In some embodiments, the average price is calculated by using a Volume Weighted Average Price (VWAP). In one embodiment, trade records eligible for compression also have the same price in addition to having the same account ID, transaction type or side, and security ID, eliminating the need to calculate an average price.

Each of the processes and algorithms described in the preceding sections may be embodied in, and fully automated by, code modules executed by one or more computers or computer processors. The code modules may be stored on any type of computer-readable medium or computer storage device, such as hard drives, solid state memory, optical disc, and/or the like. The processes and algorithms may also be implemented partially or wholly in application-specific circuitry. The results of the disclosed processes and process steps may be stored, persistently or otherwise, in any type of computer storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment.

While certain embodiments of the inventions disclosed herein have been described, these embodiments have been presented by way of example only, and are not intended to limit the scope of the inventions disclosed herein. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for processing securities transactions comprising:
    a data repository configured to store one or more trade records of securities transactions from multiple markets; and
    a computing system comprising one or more computing devices, said computing system configured to:
        select from the data repository trade records of securities transactions from multiple markets, the selected trade records comprising at least a first record from a first market and a second record from a second market;
        determine at least one destination central counterparty for the selected trade records, the selected trade records comprising uncompressed trade records;
        separate the selected trade records by respective destination central counterparty;
        transmit a first compressed trade record corresponding to the selected trade records over a communication network to a clearing entity configured to update records, and
        transmit the separated, selected trade records over the communication network to the respective destination central counterparty.

2. The system of claim 1 wherein the first market is in a first country and the second market is in a second country.

3. The system of claim 1 wherein trades on the first market are transmitted to a first destination central counterparty and trades on the second market are transmitted to a second destination central counterparty.

4. The system of claim 1 wherein the computing system is further configured to receive a report comprising of trade records, said report sent from a first destination central counterparty, said trade records in the report at least partially corresponding to the separated, selected trade records transmitted, uncompressed, to said first destination central counterparty.

5. The system of claim 4 wherein in response to receiving the report from the first destination central counterparty, the computing system is configured to:
    generate a second compressed trade record from the trade records in the report;
    compare the first compressed trade record with the second compressed trade record; and
    in response to the comparison, determine whether the selected trade records corresponding to the first compressed trade record were matched by the first destination central counterparty.

6. The system of claim 1 wherein the first compressed trade record is received from a trading entity.

7. A computer-implemented method for processing securities transactions comprising:
    selecting, by a computing system that comprises one or more computing devices, trade records of securities transactions from multiple markets, the selected trade records comprising at least a first record from a first market and a second record from a second market;
    determining, by said computing system, at least one destination central counterparty for the selected trade records, the selected trade records comprising uncompressed trade records;
    separating, by said computing system, the selected trade records by destination central counterparty;
    transmitting, by said computing system, a first compressed trade record corresponding to the selected trade records over a communication network to a clearing entity configured to update records, and transmitting, by said computing system, the separated selected trade records over the communication network to the respective destination central counterparty.

8. The method of claim 7, wherein the first market and the second market are in different countries.

9. The method of claim 7, wherein trades on the first market and the second market are transmitted to different central counterparties, including at least a first destination central counterparty and a second destination central counterparty.

10. The method of claim 9, further comprising:
receiving, by said computing system, reports comprising trade records from the first and second central counterparty over the communication network;
generating, by said computing system, a second compressed trade record from the trade records in the reports;
comparing, by said computing system, the first compressed trade record with the second compressed trade record; and
in response to the comparison, determining, by said computing system, whether the set of trade records corresponding to the first compressed trade record were matched by the central counterparty.

11. The method of claim 9, further comprising directing the clearing entity to send a transaction report corresponding to the first compressed trade record to only an entity other than the first or the second destination central counterparty.

12. The method of claim 7, further comprising receiving the first compressed trade record from a trading entity.

13. The method of claim 7, wherein the trade records are transmitted within a trade instruction transmission.

14. One or more non-transitory computer storage devices having stored thereon instructions that, when executed, direct a computing system to:
select trade records of securities transactions from multiple markets, the selected trade records comprising at least a first record from a first market and a second record from a second market;
determine at least one destination central counterparty for the selected trade records, the selected trade records comprising uncompressed trade records;
separate the selected trade records by respective destination central counterparty;
transmit a first compressed trade record corresponding to the selected trade records over a communication network to a clearing entity configured to update records, and
transmit the separated, selected trade records over the communication network to the respective destination central counterparty.

15. The one or more non-transitory computer storage devices of claim 14, wherein the first market is in a first country and the second market is in a second country.

16. The one or more non-transitory computer storage devices of claim 14, wherein trades on the first market are transmitted to a first destination central counterparty and trades on the second market are transmitted to a second destination central counterparty.

17. The one or more non-transitory computer storage devices of claim 14, wherein the first compressed trade record is received from a trading entity.

18. The one or more non-transitory computer storage devices of claim 14, wherein the computing system is further directed to process a report comprising of trade records, said report sent from a first destination central counterparty, said trade records in the report at least partially corresponding to the separated, selected trade records transmitted, uncompressed, to said first destination central counterparty.

19. The one or more non-transitory computer storage devices of claim 18, wherein in response to receiving the report from the central counterparty, the computing system is directed to:
generate a second compressed trade record from the trade records in the report;
compare the first compressed trade record with the second compressed trade record; and
in response to the comparison, determine whether the selected trade records corresponding to the first compressed trade record were matched by the first destination central counterparty.

* * * * *